(12) United States Patent
Ferstl et al.

(10) Patent No.: US 9,179,524 B2
(45) Date of Patent: Nov. 3, 2015

(54) METHOD FOR OPEN-LOOP AND CLOSED-LOOP CONTROL OF A LIGHTING BUSWAY

(75) Inventors: Peter Ferstl, Regensburg (DE); Christian Mühlfenzl, Regensburg (DE)

(73) Assignee: SIEMENS SCHWEIZ AG, Zurich (CH)

( * ) Notice: Subject to any disclaimer, the term of this patent is extended or adjusted under 35 U.S.C. 154(b) by 541 days.

(21) Appl. No.: 13/587,957

(22) Filed: Aug. 17, 2012

(65) Prior Publication Data

US 2013/0049606 A1    Feb. 28, 2013

(30) Foreign Application Priority Data

Aug. 17, 2011 (DE) .......................... 10 2011 081 097

(51) Int. Cl.
H05B 37/02 (2006.01)

(52) U.S. Cl.
CPC ............. H05B 37/0218 (2013.01); *Y02B 20/46* (2013.01)

(58) Field of Classification Search
CPC ........................... H05B 37/0218; Y02B 20/46
USPC ......... 315/153, 149, 150, 151, 152, 155, 156, 315/157, 158, 159, 120, 133, 134
See application file for complete search history.

(56) References Cited

U.S. PATENT DOCUMENTS

| | | | |
|---|---|---|---|
| 7,111,952 B2 | 9/2006 | Veskovic | |
| 8,436,549 B2 * | 5/2013 | Hasnain | 315/291 |
| 8,860,316 B2 * | 10/2014 | Barrilleaux | 315/152 |
| 2008/0170387 A1 | 7/2008 | Fluss et al. | |
| 2010/0045191 A1 | 2/2010 | Aendekerk | |
| 2010/0240418 A1 | 9/2010 | Matoba | |
| 2011/0115386 A1 | 5/2011 | Delnoij | |
| 2012/0176041 A1 | 7/2012 | Birru | |
| 2012/0268014 A1 * | 10/2012 | Johnston et al. | 315/132 |

FOREIGN PATENT DOCUMENTS

| | | |
|---|---|---|
| CN | 101227776 | 7/2008 |
| CN | 101421558 | 4/2009 |
| CN | 101563959 | 10/2009 |
| CN | 101847386 | 9/2010 |
| DE | 198 42 465 | 3/2000 |
| DE | 19842465 | * 3/2000 |
| DE | 10 2010 003 802 | 10/2011 |
| EP | 0 807 877 | 11/1997 |

(Continued)

OTHER PUBLICATIONS

Office Action mailed May 29, 2014 for corresponding Chinese Patent Application No. 201210293493.3.

*Primary Examiner* — Jung Kim

(74) *Attorney, Agent, or Firm* — Staas & Halsey LLP

(57) ABSTRACT

A method for open-loop and closed-loop control of a lighting busway with a primary luminaire and at least one secondary luminaire for an interior space, involves measuring a brightness at the location of the primary luminaire, determining a primary ambient light percentage for the primary luminaire, determining a secondary ambient light percentage for at least one secondary luminaire based on the primary ambient light percentage, and determining a secondary manipulated variable for at least one secondary luminaire based on the secondary ambient light percentage and a setpoint value for this secondary luminaire.

18 Claims, 5 Drawing Sheets

(56) References Cited

FOREIGN PATENT DOCUMENTS

| EP | 1 610 197 A2 | 12/2005 |
|---|---|---|
| WO | WO 2004/086195 A2 | 10/2004 |
| WO | 2010/010491 | 1/2010 |
| WO | 2011/033444 | 3/2011 |

* cited by examiner

Fig. 5A

1. $E_{primary\_daylight\_percentage} = E_{measured} - E_{without\_daylight}(S_{actual})$ 2. $E_{secondary\_daylight\_percentage} = E_{primary\_daylight\_percentage} * Factor_{secondary\_luminaire}$ 3. $Manipulated\_Variable_{secondary\_luminaire} = f(E_{setpoint\_variable\ primary\_luminaire}, E_{secondary\_daylight\_percentage})$

Fig. 5B $Factor_{secondary\_luminaire} = Daylight_{secondary\_luminaire} / Daylight_{primary\_luminaire}$

METHOD FOR OPEN-LOOP AND CLOSED-LOOP CONTROL OF A LIGHTING BUSWAY

CROSS REFERENCE TO RELATED APPLICATIONS

This application is based on and hereby claims priority to German Application No. 10 2011 081 097.8 filed on Aug. 17, 2011, the contents of which are hereby incorporated by reference.

BACKGROUND

The present invention relates to a method for open-loop and closed-loop control of a lighting busway having a primary luminaire and at least one secondary luminaire for an interior space. The present invention further relates to a lighting busway having a primary luminaire and a secondary luminaire for lighting an interior space.

It is known that lighting busways are used for lighting interior spaces. A plurality of luminaires is used for this, which are fixed in different positions, for example on the ceiling, of the interior space. It is also known that such lighting busways are actively regulated using brightness sensor technology. In this case it has proved disadvantageous if all luminaires are each provided with a sensor and a regulating device of their own. As a result the complexity and also the costs of such devices and methods of closed-loop control are increased many times over.

It has also already been proposed to differentiate the individual luminaires of a lighting busway into a primary luminaire and one or more secondary luminaires. In known methods a single sensor for closed-loop control of the primary luminaire is made available for controlling such lighting busways. The secondary luminaires are controlled in fixed dependency on the primary luminaire. In other words a fixed factor is defined for the secondary luminaire or the plurality of secondary luminaires, by which a manipulated variable for the secondary luminaires is adjusted as a function of the manipulated variable for the primary luminaire. If for example a manipulated variable of 40% is defined for the primary luminaire using the sensor and the corresponding closed-loop control, fixed manipulated variables are correspondingly defined for each secondary luminaire as a function of the fixed factor. If for example a factor of −10% is defined in respect of the manipulated variable of the primary luminaire, this means that the corresponding secondary luminaire is given 40% minus 10%, i.e. 30%, as a manipulated variable.

A disadvantage of the embodiments of known methods described above is that they are inflexible. In particular they work only in specific daytime situations, i.e. in the case of specific and restricted light incidences. Additionally they entail the disadvantage that in the absence of any incidence of ambient light, i.e. at night, or with a low incidence of ambient light the interior space is illuminated non-uniformly. Because fixed factors are used, the secondary luminaires can never exercise their full luminosity. Instead, even when it is completely dark outside the interior space, i.e. with a percentage of ambient light of approx. 0%, the corresponding secondary luminaire will not be fully, i.e. 100%, illuminated. This results in undesired non-uniformities in the illumination of the space.

SUMMARY

One potential object is to eliminate, at least in part, the above-described disadvantages of known methods and devices. In particular it is a potential object to make available a method for open-loop and closed-loop control of a lighting busway as well as a lighting busway containing a primary luminaire and a secondary luminaire for an interior space, which enables flexible control of the secondary luminaires simply and at a low-cost. In particular a uniform illumination of the interior space by the primary luminaire and the secondary luminaire should be achievable even in the complete absence of ambient light.

The inventors propose a method for open-loop and closed-loop control of a lighting busway with a primary luminaire and at least one secondary luminaire for an interior space the following steps are provided:
  measuring a brightness at the location of the primary luminaire,
  determining a primary ambient light percentage for the primary luminaire,
  determining a secondary ambient light percentage for at least one secondary luminaire based on the primary ambient light percentage,
  determining a secondary manipulated variable for at least one secondary luminaire based on the secondary ambient light percentage and a setpoint value for this secondary luminaire.

Compared to known methods and lighting busways the proposed method is used to make the secondary manipulated variable dependent on the measured primary ambient light percentage. A simple control chain is provided here, so that a feedback loop between the secondary luminaire and the method is not necessary. Instead, a single value for the brightness at the location of the primary luminaire is used both for closed-loop control of the primary luminaire and for open-loop control of the secondary luminaire. Thus with a low level of complexity of the entire lighting busway, the proposed method enables flexible open-loop control of the individual secondary luminaires to be effected. Because a dependency exists between the secondary manipulated variable and the primary ambient light percentage, it can be ensured that when it is completely dark outside the interior space, i.e. at a primary ambient light percentage of approx. 0%, the corresponding secondary manipulated variables for the secondary luminaires can be raised to up to 100%. Thus a uniform illumination can be achieved in a wide variety of lighting situations outside the interior space, in particular even if it is completely dark outside the interior space. Accordingly the terms ambient light percentage, primary ambient light percentage and secondary ambient light percentage in particular can also be referred to as percentage of daylight, primary percentage of daylight and secondary percentage of daylight and/or can be replaced by these terms.

In connection with this discussion, a "luminaire" means a group containing at least one lamp, which can be individually actuated or regulated. Of course it is also possible for at least one of the luminaires to have more than one lamp. If a plurality of lamps is arranged in an interior space, these can preferably be variably assigned to individual luminaires. For example, a series of lamps in the ceiling of a space can be defined as a primary luminaire. Other series positioned closer to or further from a window each form individual secondary luminaires. The individual luminaires are characterized in particular by their position in the interior space. Particular preference is given in this case to the position relative to the position of incidence of ambient light, for example a window, relevant for the grouping into the primary luminaire and/or the secondary luminaire. Furthermore, each lamp is preferably assigned to just a single luminaire. The assignment to the individual luminaires is in this case fixed for the method.

Fuller details of the individual steps of the method will be given later. However, it should be noted in particular that flexibility of the secondary manipulated variable is achieved inasmuch as a secondary ambient light percentage is determined. This in turn is based on the primary ambient light percentage, so that the secondary ambient light percentage is not measured but is determined from the primary ambient light percentage. Accordingly a plurality of values for the primary ambient light percentage and one or more secondary ambient light percentages are determined from a single measurement of brightness. "Ambient light" in the context of this discussion means light which is not itself generated by the lighting busway. In particular it relates in the case of ambient light in the context of this discussion at least in part to daylight from outside the space.

The setpoint value for the secondary luminaire is in particular the brightness setpoint value at the position of the secondary luminaire. It can be advantageous here if the setpoint value for the secondary luminaire is identical to the setpoint value for all secondary luminaires and/or is identical to the setpoint value for the primary luminaire. Preferably a common brightness setpoint value is provided for the whole lighting busway, so that a uniform illumination is effected for the whole lighting busway. The result is that for example 100% illumination is desired as the setpoint value. If for example a secondary ambient light percentage of 90% is determined for a secondary luminaire, the corresponding secondary luminaire need only still supply 10% of residual light, so that a corresponding secondary manipulated variable is determined. If in the case of another secondary luminaire a secondary ambient light percentage of 40% is determined, 60% is defined as the secondary manipulated variable, so that in total the desired brightness setpoint value of 100% is also achieved in the case of this secondary luminaire. As described above, in this way a dynamization of the control of the secondary luminaires is achieved, so that without additional complexity in terms of design and measurement a variable and flexible control of the secondary luminaires is enabled thanks to an method.

The primary ambient light percentage is executed by comparing a brightness curve of the primary luminaire without ambient light and the measured brightness, in each case in respect of a primary manipulated variable of the primary luminaire. In particular a subtraction is effected using this comparison, so that the brightness according to the brightness curve of the primary luminaire without ambient light is deducted from the measured brightness. In other words it is assumed that the measured brightness is composed of at least two components. The first component is the ambient light, i.e. the primary ambient light percentage, and the second component is the light generated by the primary luminaire. Because the light generated by the primary luminaire is known from the corresponding brightness group of the primary luminaire without ambient light, this known value can be deducted from the measured value, in order by simple subtraction to obtain the desired primary ambient light percentage. Closed-loop control is preferably effected here, i.e. the feedback loop between the measurement and the actuation of the primary luminaire, such that in total a setpoint value for the brightness of for example, in a standardized version, 100%, is achieved. The values can of course also be indicated here as absolute values, for example using [lux] as the unit, besides a standardized variant as a percentage.

It can further be advantageous if the secondary ambient light percentage of at least one secondary luminaire is determined by multiplying the primary ambient light percentage by a factor specific to this secondary luminaire. An example that can be cited here is how without any additional measurement a secondary ambient light percentage can be determined, in particular calculated, for each secondary luminaire. The specific factor is here in particular location-specific. Thus such a factor is provided for each secondary luminaire. Accordingly, a factor specific to this secondary luminaire is also used for each secondary luminaire, so that for each secondary luminaire a separate secondary ambient light percentage is achieved. The number of secondary luminaires is not limited here. The factor is a specific factor, which in particular contains the relationship of the corresponding secondary luminaire to the position of incidence of ambient light, i.e. for example a window. In particular this specific factor is fixed in advance for each secondary luminaire. This specific factor is specific to the secondary luminaire, but also to the whole lighting busway as well as the corresponding interior space. If the lighting busway is divided differently, the secondary luminaires are grouped differently or the light situation changes in the interior space because of a change in the position of incidence of ambient light, the specific factors for the secondary luminaires must also be adjusted.

It is advantageous if the specific factor is determined by a calibration method, which takes account of the ambient light gradient from an incidence position of the ambient light into the interior space for the at least one secondary luminaire. In this way a calibration of the whole lighting busway is effected, in particular in the form of a calibration curve. The ambient light gradient can for example be recorded by an illumination photometer. In this case the ambient light gradient can be recorded both two-dimensionally and three-dimensionally. In particular the direct or indirect distance from a position of incidence, for example a window, must be taken into account for ambient light.

It can be advantageous if the calibration method has at least the following steps:
   determining the current ambient light values in the absence of artificial light for the primary luminaire and for at least one secondary luminaire,
   determining the specific factor for at least one secondary luminaire by dividing the ambient light value for the at least one secondary luminaire by the ambient light brightness for the primary luminaire.

The above embodiment is one possibility for a calibration method. It is specifically remarked here that the daytime values for the primary luminaire and the secondary luminaire are compared to one another. This comparison results in a percentage value which represents the development of the ambient light values across the individual luminaires. Thus such a calibration curve can also be understood as a reference curve which emulates the development of the ambient light in the interior space.

The calibration method can of course be performed at one or else at several different points in time. It is advantageous if the calibration method is performed at several different points in time. The points in time here differ preferably in respect of the ambient light situation. Thus they differ for example as regards the time of day, so that calibration curves can be generated for the morning, afternoon and evening situation. Points in time in respect of the season, i.e. summer, winter, fall and spring, are also conceivable in respect of different calibration curves using the calibration method. It is then possible, after the calibration method has been executed a number of times, to average different calibration curves in order to obtain a single calibration curve for the performance of the proposed method. It is also possible for a plurality of time-dependent calibration curves to be generated, which are all used for the proposed method.

It can hence be advantageous if a specific factor which is time-dependent is used when determining the secondary ambient light percentage. The time-dependency of the specific factor as it were corresponds to a time-dependent calibration curve. This means that the open- and closed-loop control method is also effected on a time-dependent basis, in particular as a function of the time of day and/or the season. In other words a different specific factor for determining the secondary ambient light percentage is used for a point in time in the morning than is the case for example in the afternoon.

It can also be advantageous if the specific factor for at least one secondary luminaire relates to a primary ambient light percentage which is standardized to the primary luminaire. Such standardization means that the primary ambient light percentage for example is set to 1 in the case of the primary luminaire. Accordingly the factors for secondary luminaires which are closer to the window become greater than 1 and for secondary luminaires which are further from the window than the primary luminaire, less than 1. This standardization simplifies the subsequent determination or calculation steps, so that a further cost reduction in respect of the performance of the proposed method in a closed-loop and open-loop control device can be achieved.

It is also advantageous if a comparison is performed between a setpoint value for the brightness at the location of the secondary luminaire and the secondary ambient light percentage when determining the secondary manipulated variable for at least one secondary luminaire. In particular this comparison involves the subtraction of the setpoint values minus the secondary ambient light percentage. As already explained, the setpoint value is here preferably identical to the setpoint values for all secondary luminaires or identical to the setpoint value for the primary luminaire. Thus for example a setpoint value of 100% is envisaged, so that in the case of a secondary ambient light percentage of for example 60% the secondary manipulated variable has to be set to 40% in order to achieve this setpoint value.

It can likewise be advantageous if a primary manipulated variable for the primary luminaire is determined on the basis of the primary ambient light percentage. Thus the proposed method is used both for the closed-loop control of the primary luminaire and also for the open-loop control of the secondary luminaires. In this way all luminaires are controlled or regulated jointly by the proposed method.

It can be advantageous if the primary manipulated variable is applied in a closed-loop control circuit and the secondary manipulated variable in an open-loop control system. Reducing the complexity for the secondary manipulated variable to an open-loop control system in comparison to the more expensive closed-loop control system entails benefits of cost and speed when performing the proposed method. In particular the corresponding execution device for the method can be of simpler design and the lines can accordingly be of cheaper design in respect of the connection between said execution device and the secondary luminaires for the open-loop control system.

Because a plurality of open-loop control systems is necessary for the secondary luminaires instead of closed-loop control systems, a plurality of sensors can be dispensed with, so that using the proposed method the complexity of a lighting busway is also reduced.

It is likewise advantageous if the setpoint value of at least one secondary luminaire differs from a setpoint value of at least one other secondary luminaire and/or of the primary luminaire. Thus the flexibility of the proposed method can be increased still further. In particular it is also possible in this way to effect a variation in the illumination of the interior space, which is always maintained regardless of the ambient light percentage. Thus it is for example possible to provide individual secondary luminaires, which for example are assigned directly to a workstation, with a higher setpoint value for the desired brightness than other secondary luminaires. Deliberate and desired disparities in the illumination of the interior space can thus be achieved, without impairing the desired dependency on the ambient light percentage.

The inventors also propose a lighting busway with a primary luminaire and at least one secondary luminaire for lighting an interior space. The proposed lighting busway is characterized in that a brightness regulation device is provided, which is designed for the execution of the proposed method. Accordingly the proposed lighting busway entails the same advantages as have been fully explained in respect of the proposed method. The brightness device here has in particular a sensor in order to determine the brightness for the primary luminaire. Dimmers can be provided for each luminaire for example in the brightness regulation device or also separately for each secondary luminaire, and can be actuated with a corresponding manipulated variable by the brightness regulation device.

It can be advantageous if in the case of the proposed lighting busway the brightness regulation device is arranged in or on the primary luminaire. The primary luminaire can as it were be referred to as a master, while the secondary luminaires are referred to as slaves. The primary luminaire here serves as the most complex unit, which simultaneously has the highest price. Any number of secondary luminaires can be assigned to this primary luminaire, without in the main increasing the complexity of the whole lighting busway.

Individual units are preferably provided in the case of a brightness device for the individual execution steps of the method. In particular a comparison unit, an arithmetic unit, a determination unit, a multiplication unit and/or a division unit are embodied in the brightness regulation device.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5a shows an embodiment of the determination method and FIG. 5b shows an embodiment of the calculation method for a calibration method.

DETAILED DESCRIPTION OF THE PREFERRED EMBODIMENT

Figure 1:
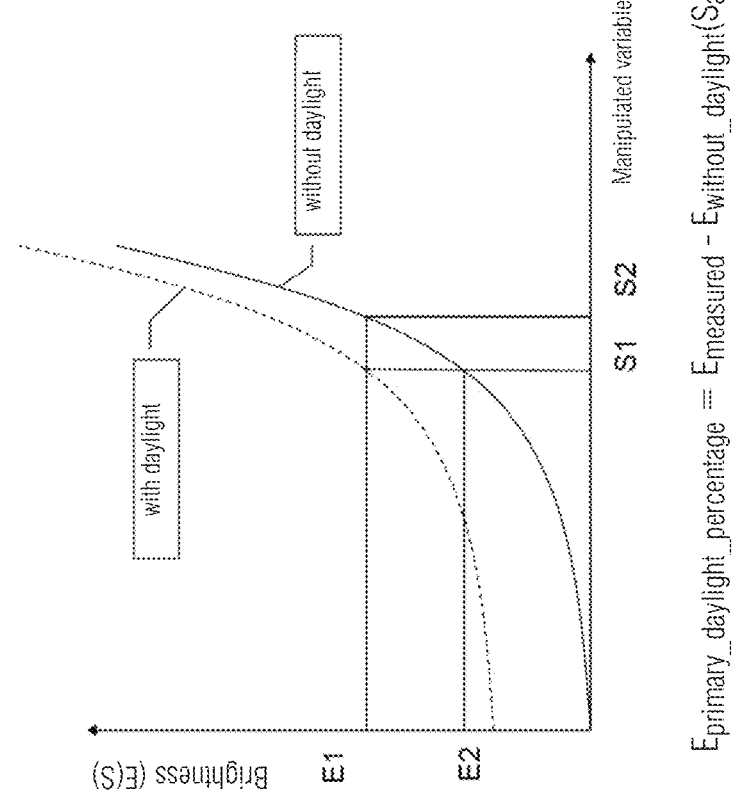
FIG. 1 shows an illustration of graphs of the brightness using the manipulated variable of the primary luminaire.

Reference will now be made in detail to the preferred embodiments of the present invention, examples of which are illustrated in the accompanying drawings, wherein like reference numerals refer to like elements throughout.

Figure 2:
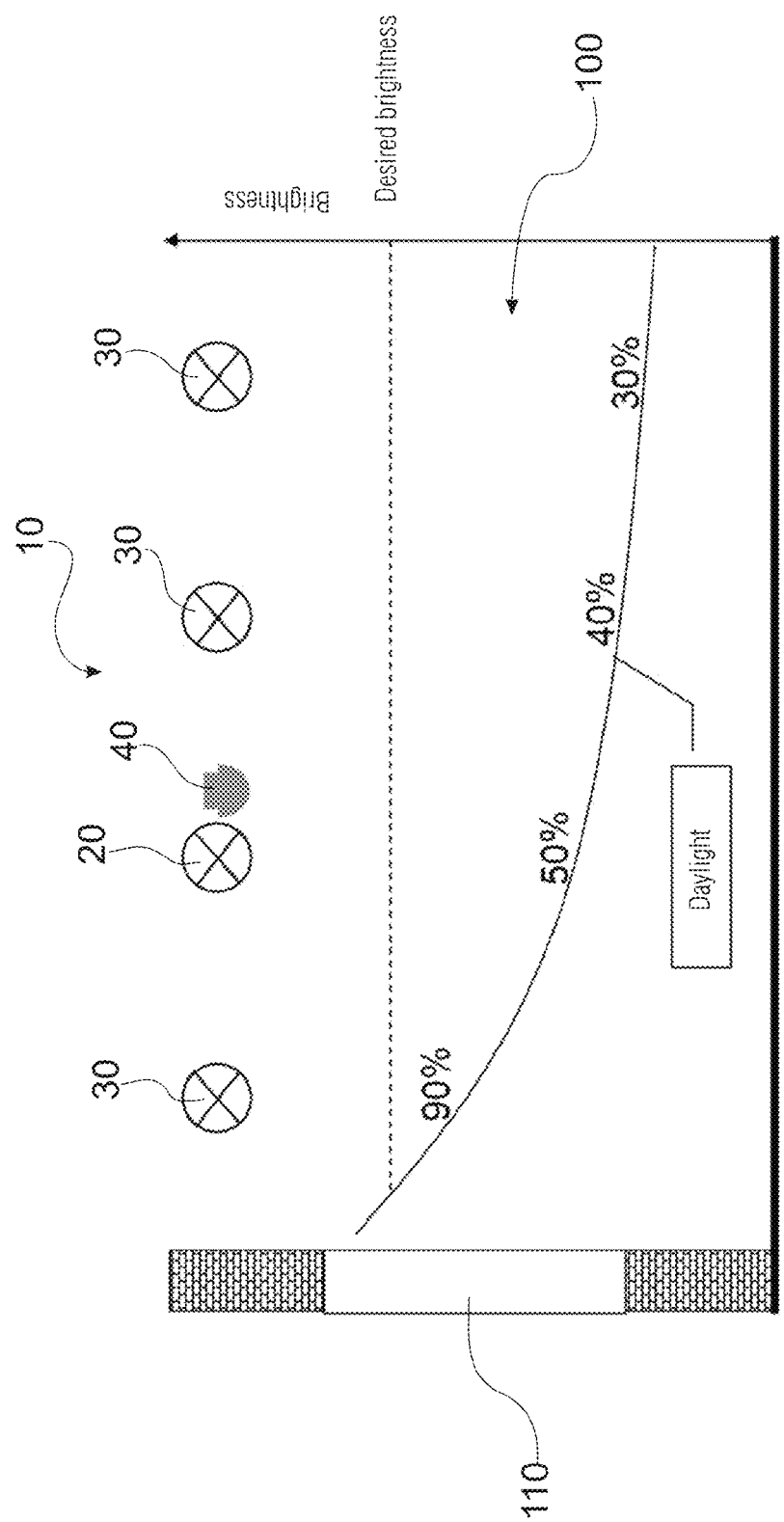
FIG. 2 shows an embodiment of the proposed lighting busway.

FIG. 2 schematically illustrates an embodiment of the proposed lighting busway 10. In this embodiment the lighting busway 10 has one primary luminaire 20 and three secondary luminaires 30. The schematic illustration in FIG. 2 in essence shows a section through an interior space 100, so that each luminaire 20, 30 has a plurality of lamps, which are arranged in series along an axis which is perpendicular to the drawing plane of FIG. 2. It can be seen that the interior space 100 has a window which acts as an incidence position 110 for ambient light. A curve for ambient light is plotted across the interior space 100, and corresponds to the ambient light curve. This ambient light curve can for example be determined in that for a plurality of positions an illumination photometer measures the incident amount of ambient light when a lighting busway 10 is switched off. This ambient light curve is in particular time-dependent and can be determined for different times of day and different seasons.

In FIG. 2 it is also apparent that an explicit value for the ambient light, namely 90%, 40% and 30%, is defined for each secondary luminaire 30. Thus the ambient light gradient is determined, based on which a specific factor can be defined as a reference curve, in order to determine the respective secondary ambient light percentage from a primary ambient light percentage.

Figure 3:
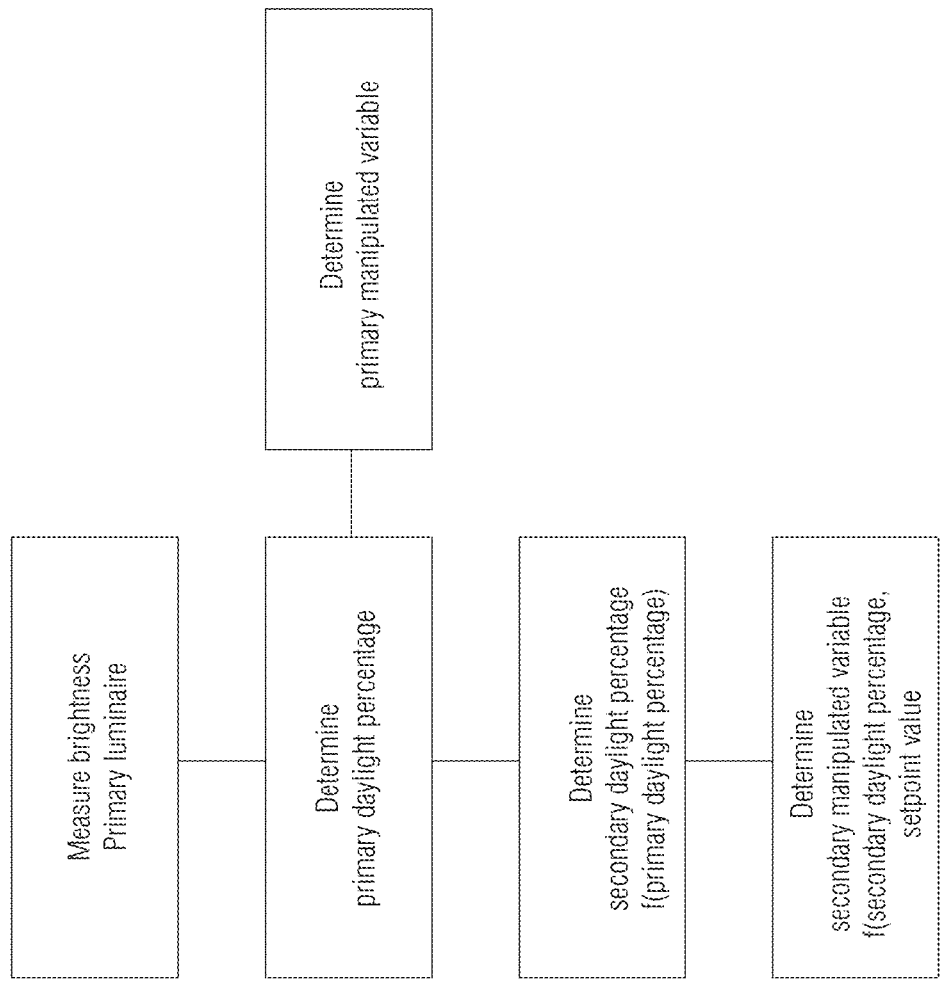
FIG. 3 shows an embodiment of the proposed method.

FIG. 3 schematically illustrates an embodiment of the proposed method. In a first step the brightness of the primary luminaire 20 is determined. To this end reference is made to FIG. 2, where a sensor is provided which in the example in FIG. 2 determines a value of 100% for the brightness in the case of the primary luminaire. The primary ambient light percentage is then determined. The procedure for this is for example as illustrated in FIG. 1. For the primary luminaire 20 a brightness curve is known such as develops without ambient light. In FIG. 1 this curve is illustrated by a continuous line. If a value for the brightness is now measured and the corresponding manipulated variable is known for the primary luminaire, then the difference between the continuous line without ambient light and the value with ambient light, i.e. the measured value, is determined in respect of the respective position of the primary luminaire 20 as the remainder of the primary ambient light percentage. FIG. 2 relates to a situation in which the primary ambient light percentage is 50%. Based on this primary ambient light percentage a primary manipulated variable can be generated which regulates the primary luminaire to the effect that a desired brightness of 100% is achieved.

Then, as can be seen from FIG. 3, the secondary ambient light percentage is determined. This is effected on the basis of the primary ambient light percentage. One possibility for such a determination is for example illustrated in FIG. 5a, where following the determination of the primary ambient light percentage, as has already been explained for FIG. 1, the determination of the secondary ambient light percentage can be found under point 2. Here the secondary ambient light percentage is calculated as a function of the primary ambient light percentage, in that it is multiplied by a factor specific to the secondary luminaire. For example, for the second secondary luminaire 30 from the right in FIG. 2 this specific factor is 0.8. Thus in order to arrive at the secondary ambient light percentage for this secondary luminaire 30 from the measured primary ambient light percentage of 50%, the 50% must be multiplied by 0.8, so that the 40% is achieved on the basis of the residual light curve according to FIG. 2. It should be pointed out here that this involves a determination and not a measurement, so that no sensor is required for the respective secondary luminaire 30.

As is apparent in FIG. 3 and also in FIG. 5a, the last step of the proposed method is the determination of the secondary manipulated variable. This is a function dependent on a setpoint value as well as on the secondary ambient light percentage. For example, this can take the form of a comparison. In FIG. 2 for example 100% is defined as a setpoint value for all secondary luminaires 30 jointly as the brightness. If for example a secondary ambient light percentage of 90% is determined for the secondary luminaire 30 on the far left, this function and the corresponding comparison operators and/or the difference is used to make a manipulated variable available for the secondary luminaire, which makes 10% necessary for the secondary luminaire 30 in order to make up the remainder to the setpoint value. Thus a flexible distribution is achieved, so that a desired brightness is effected across the whole interior space 100 as a function of the primary ambient light percentage. Dynamic or flexible control is thus effected of all secondary luminaires 30 as a function of a single measured value, namely the measured brightness and values determined therefrom for the primary ambient light percentage.

Figure 4:
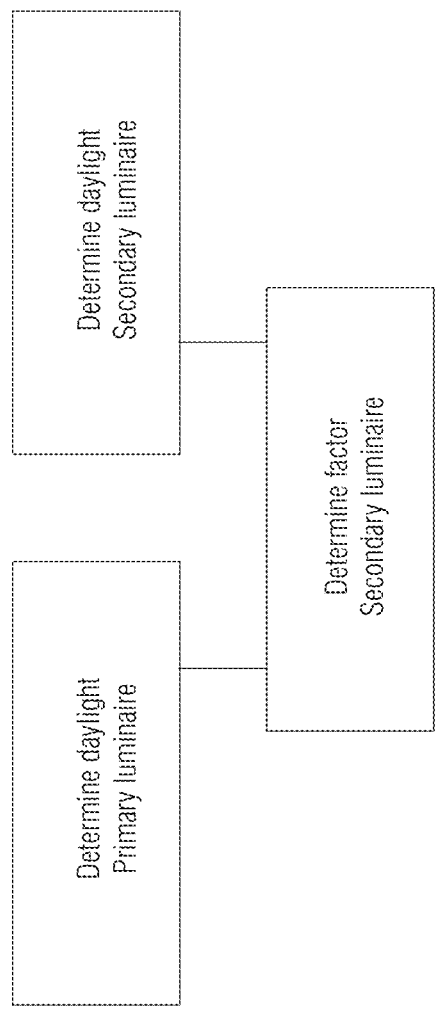
FIG. 4 shows an embodiment of a calibration method.

FIGS. 4 and 5b illustrate a variant of a calibration method. According to this embodiment the corresponding ambient light value is determined both for the primary luminaire and for the secondary luminaire when there is ambient light and when a lighting busway 10 is switched off. Using the formula according to FIG. 5b as a division this for example produces the factor for the corresponding secondary luminaire 30. This is preferably performed for each secondary luminaire 30 and in particular also at different points in time. The points in time differ here for example in respect of the time of day and/or in respect of the season. When performing the proposed method according to 5a a factor specific to the respective secondary luminaire 30 can preferably be used here, which in addition can also be time-dependent. This time-dependency also enables different incidence situations to be taken into account for the incidence position 110 into the interior space 100.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for open-loop and closed-loop control of a lighting busway for an interior space, the lighting busway having a primary luminaire and a secondary luminaire, the method comprising:
    measuring a brightness at a location of the primary luminaire;
    determining a primary ambient light percentage for the primary luminaire by comparing a brightness curve of the primary luminaire without ambient light and the combined brightness measured at the location of the primary luminaire with ambient light and light from the primary luminaire, in each case with respect to a primary manipulated variable of the primary luminaire;
    determining a secondary ambient light percentage for the secondary luminaire based on the primary ambient light percentage; and
    determining a secondary manipulated variable for the secondary luminaire based on the secondary ambient light percentage and a setpoint value for the secondary luminaire.

2. The method as claimed in claim 1, wherein the secondary ambient light percentage of the secondary luminaire is determined by multiplying the primary ambient light percentage by a specific factor for the secondary luminaire.

3. The method as claimed in claim 2, wherein
there are a plurality of secondary luminaires,
each secondary luminaire has a respective specific factor that depends on a position of the secondary luminaire within the interior space, and
the secondary ambient light percentage and the secondary manipulated variable are determined individually for each secondary luminaire.

4. The method as claimed in claim 2, wherein
the specific factor is determined using a calibration method which takes into account an ambient light gradient from an incidence position of the ambient light into the interior space for the secondary luminaire.

5. The method as claimed in claim 4, wherein the calibration method comprises:
determining current ambient light values in the absence of artificial light for the primary luminaire and for the secondary luminaire; and
determining the specific factor for the secondary luminaire by dividing the ambient light value for the secondary luminaire by the ambient light value for the primary luminaire.

6. The method as claimed in claim 4, wherein the calibration method is performed several times at different points in time.

7. The method as claimed in claim 6, wherein when determining the secondary ambient light percentage, the specific factor used is time-dependent.

8. The method as claimed in claim 2, wherein
the primary ambient light percentage is standardized to the primary luminaire, and
the specific factor for the secondary luminaire relates to the primary ambient light percentage.

9. The method as claimed in claim 1, wherein when determining the secondary manipulated variable for the secondary luminaire, a comparison is performed between a setpoint value for brightness at a location of the secondary luminaire and the secondary ambient light percentage.

10. The method as claimed in claim 1, wherein a primary manipulated variable is determined for the primary luminaire based on the primary ambient light percentage.

11. The method as claimed in claim 10, wherein the primary manipulated variable is applied in a closed-loop control circuit and the secondary manipulated variable is applied in an open-loop control system.

12. The method as claimed in claim 1, wherein
the lighting busway includes at least first and second secondary luminaires, and
the setpoint value of the first secondary luminaire differs from the setpoint value of at least one of the second secondary luminaire and the primary luminaire.

13. The method as claimed in claim 1, wherein
the brightness measured at the location of the primary luminaire includes an artificial light component and a natural, ambient light component,
the primary ambient light percentage is obtained using a brightness curve of the primary luminaire without ambient light,
a primary manipulated variable of the primary luminaire relates to an amount of power supplied to the primary luminaire, and
the primary ambient light percentage is obtained from a comparison of the brightness measured while using the primary manipulated variable and a brightness that would be obtained using the primary manipulated variable, without the ambient light component.

14. The method as claimed in claim 2, wherein
ambient light is introduced into the interior space from an incidence position, and
the specific factor is determined using a calibration method which takes into account:
an ambient light gradient specifying how the ambient light decreases across the interior space, with increased distance from the incidence position; and
relative positions of the primary and secondary luminaire with respect to the incidence position.

15. The method as claimed in claim 14, wherein
the ambient light gradient changes with time and depends on a relative position of the sun, and
the secondary ambient light percentage is determined using the ambient light gradient appropriate for a current time of day.

16. The method as claimed in claim 1, wherein
the lighting busway includes at least first and second secondary luminaires,
the primary luminaire, the first secondary luminaire and the second secondary luminaire have a common setpoint value, and
the common setpoint value is achieved by using a different manipulated variable for each of the first and second secondary luminaires and the primary luminaire.

17. A lighting busway comprising:
a primary luminaire and a secondary luminaire for lighting an interior space; and a brightness regulation device comprising:
a light sensor to measure a brightness at a location of the primary luminaire; and
an electronic device to:
determine a primary ambient light percentage for the primary luminaire by comparing a brightness curve of the primary luminaire without ambient light and the combined brightness measured at the location of the primary luminaire with ambient light and light from the primary luminaire, in each case with respect to a primary manipulated variable of the primary luminaire;
determine a secondary ambient light percentage for the secondary luminaire based on the primary ambient light percentage; and
determine a secondary manipulated variable for the secondary luminaire based on the secondary ambient light percentage and a setpoint value for the secondary luminaire.

18. The lighting busway as claimed in claim 17, wherein the brightness regulation device is arranged in or on the primary luminaire.

* * * * *